Figure 1:
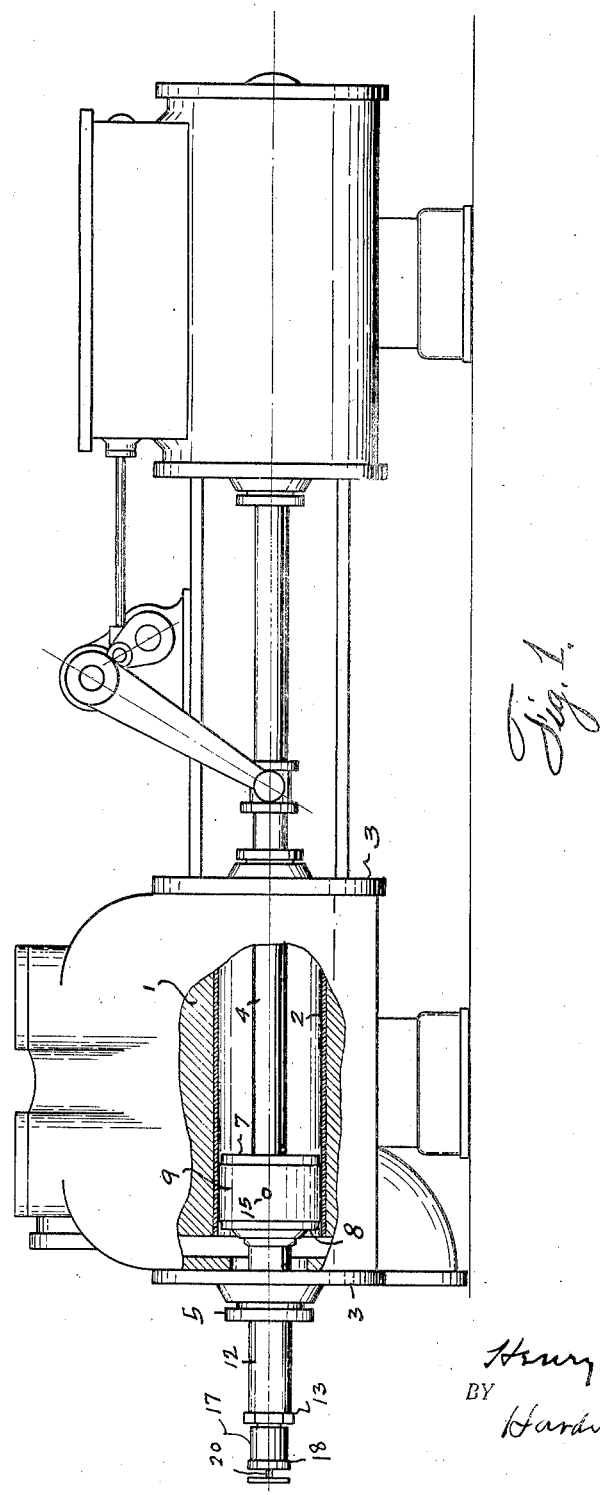

Oct. 22, 1929.  H. JOHN  1,732,366
PUMP
Filed Feb. 8, 1927   2 Sheets-Sheet 1

INVENTOR.
Henry John
BY
ATTORNEYS.

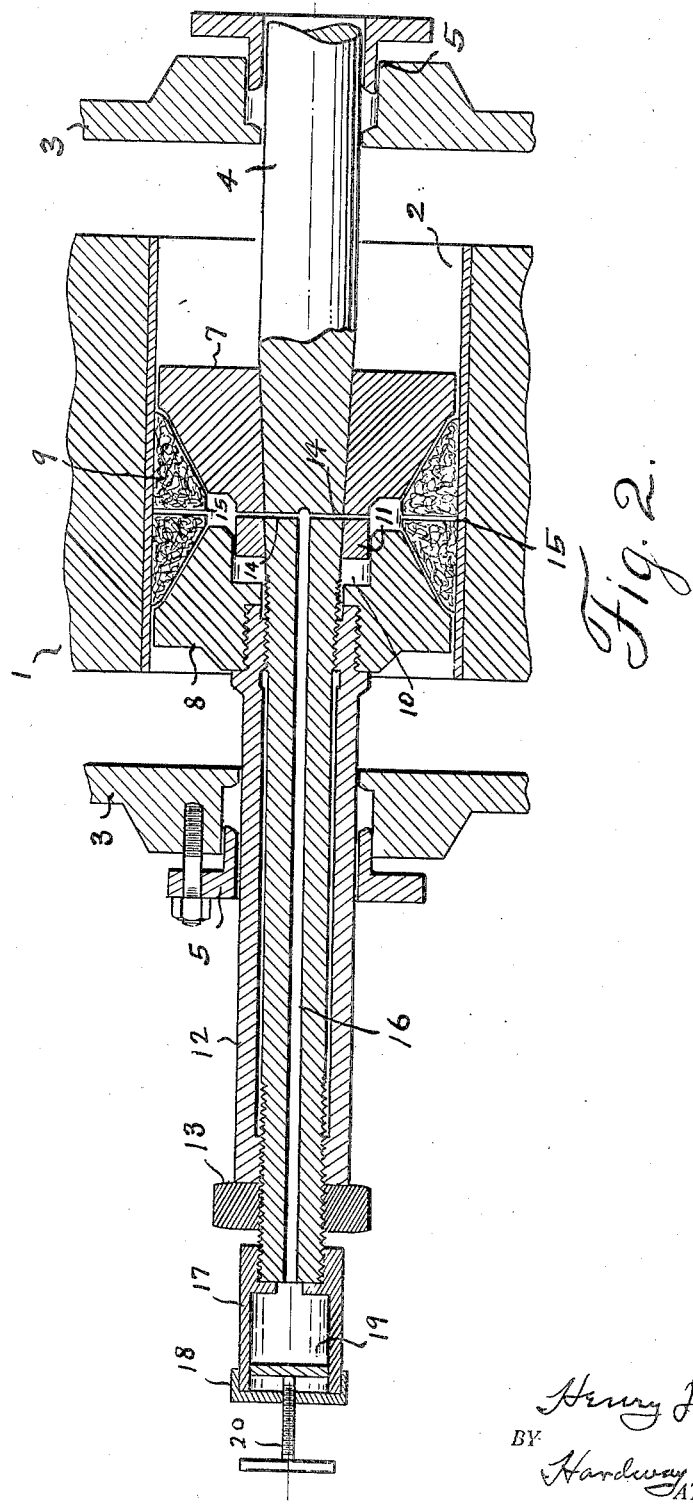

Patented Oct. 22, 1929

1,732,366

UNITED STATES PATENT OFFICE

HENRY JOHN, OF HOUSTON, TEXAS

PUMP

Application filed February 8, 1927. Serial No. 166,695.

This invention relates to new and useful improvements in a pump.

One object of the invention is to provide, in a pump, a novel type of plunger, with means for lubricating the plunger and the walls of the liner of the pump cylinder.

A further feature of the invention resides in the provision of a novel type of plunger embodying an expansible packing sleeve preferably of rubber or similar material with means for adjusting said sleeve so that it will at all times form a close fit in the cylinder liner, said adjusting means being easily accessible for accomplishing the adjustment.

With the above and other objects in view the invention has particular relation to certain novel features of construction, arrangement of parts and use, an example of which is described in this specification and illustrated in the accompanying drawings, wherein:—

Figure 1 shows a side elevation of a pump, partly in section, embodying the invention, and Figure 2 shows a fragmentary longitudinal sectional view of the pump showing the plunger and plunger rod therein.

Referring more particularly to the drawings, the numeral 1 designates the pump body having a cylinder therein provided with a liner 2. The numerals 3, 3, designate the cylinder heads. There is a plunger rod 4 which works through the stuffing boxes 5, 5, in the respective cylinder heads. Within the liner there is a plunger formed with the follower heads 7, 8. These heads may be of any desired form, but as shown are substantially frusto-conical in form with their smaller ends adjacent and a packing sleeve surrounds and conforms to the contour of the adjacent ends of these follower heads. This packing sleeve is expansible and is preferably formed of rubber, or other suitable material and fits closely within the liner 2. The inner end of the follower head 8 has a socket 10 and the adjacent end of the follower head 7 has a tubular extension 11 adapted to work in said socket. The follower head 7 is fixed on the rod 4. The outer end of the piston rod 4 is surrounded by a tubular sleeve 12 whose ends are reduced inwardly and threaded on to said rod. One end of the sleeve is threaded into the follower head 8 and threaded on to the outer end of the rod and abutting the outer end of said sleeve there is a lock nut 13. The sleeve 12 may thus be adjusted lengthwise relative to the plunger rod so as to adjust the follower head 8 toward or from the follower head 7 and the packing sleeve 9 will be thus correspondingly adjusted to form the desired fit within the cylinder liner 2. The extension 11 of the head 7 has the radial ducts 14 and aligned with these ducts 14 are the radial ducts 15 through the sleeve 9. Connected with the ducts 14 there is an axially extending duct 16 through the rod 4 which extends to the outer end of said rod and threaded onto said outer end there is an oil cup 17 whose outer end is closed by the cap 18 and within this cap there is a plunger 19, which may be actuated through the hand screw 20, which has a threaded connection with the cap 18.

The cup 17 is filled with a lubricant and by forcing the plunger 19 against the lubricant in an obvious manner by manipulating the screw 20 the lubricant is forced through the channels 16, 14 and 15 and thus supplied to the inner walls of the liner 2 and the plunger and liner thereby lubricated.

When the packing sleeve becomes worn it may be adjusted by turning the sleeve 12 to force the follower head 8 toward the follower head 7 and when the proper adjustment is obtained the nut 13 may then be screwed up against the sleeve 12 to maintain said adjustment.

The ducts 15 may be lined with metal tubes, if desired, to prevent them from becoming closed when the sleeve 9 is placed under compression.

What I claim is:

In a pump, a cylinder, a plunger rod, a plunger on said rod and reciprocable in the cylinder, said plunger including two approximately frusto-conical shaped follower heads disposed with their smaller ends adjacent, an expansible sleeve around the adjacent ends of said head, one of said heads being fixed on said rod, a sleeve on said rod and connected to the other head, the ends of said sleeve being thickened inwardly and threaded onto the rod, and means for fixing said adjustable sleeve against adjustment on said rod.

In testimony whereof I have signed my name to this specfication.

HENRY JOHN.